(12) United States Patent
Kim et al.

(10) Patent No.: US 11,035,540 B2
(45) Date of Patent: Jun. 15, 2021

(54) LAMP FOR VEHICLE

(71) Applicant: SL Corporation, Daegu (KR)

(72) Inventors: Hak Bong Kim, Gyeongsan-si (KR);
Han Sub Lee, Gyeongsan-si (KR);
Myong Guan Jeong, Gyeongsan-si (KR);
Dong Gyun Hong, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 17/029,276

(22) Filed: Sep. 23, 2020

(65) Prior Publication Data
US 2021/0148535 A1    May 20, 2021

(30) Foreign Application Priority Data
Nov. 20, 2019    (KR) .................... 10-2019-0149664

(51) Int. Cl.
| | | |
|---|---|---|
| *F21V 5/00* | (2018.01) | |
| *F21S 41/20* | (2018.01) | |
| *F21V 5/04* | (2006.01) | |
| *F21W 104/00* | (2018.01) | |
| *F21S 41/29* | (2018.01) | |

(52) U.S. Cl.
CPC ............ *F21S 41/285* (2018.01); *F21V 5/04* (2013.01); *F21S 41/295* (2018.01); *F21V 5/007* (2013.01); *F21W 2104/00* (2018.01)

(58) Field of Classification Search
CPC ........ B60Q 1/28; F21S 41/285; F21S 41/295; F21S 41/63; F21V 5/04; F21V 5/007; F21V 7/0083; F21W 2104/00
See application file for complete search history.

(56) References Cited

U.S. PATENT DOCUMENTS

| | | | | |
|---|---|---|---|---|
| 2002/0149494 A1* | 10/2002 | Martineau | ................. | F21V 5/04 |
| | | | | 362/540 |
| 2011/0038151 A1* | 2/2011 | Carraher | .................. | F21V 5/04 |
| | | | | 362/242 |
| 2011/0267823 A1* | 11/2011 | Angelini | ................. | F21V 5/007 |
| | | | | 362/277 |
| 2017/0023207 A1* | 1/2017 | Hayashi | ................ | F21V 7/0083 |

\* cited by examiner

*Primary Examiner* — Y M. Quach Lee
(74) *Attorney, Agent, or Firm* — Nelson Mullins Riley & Scarborough LLP; Kongsik Kim, Esq.

(57) ABSTRACT

A lamp for a vehicle allows a pedestrian to identify a state of the vehicle by displaying an emblem, logo, or driving status of the vehicle. The lamp for the vehicle includes a substrate; a light source unit including a plurality of light sources disposed on the substrate to generate light; a lens unit including a plurality of optical lenses through which the light is transmitted; and an imaging sheet on which the light transmitted through the plurality of optical lenses is projected to form a lighting image. In particular, each of the plurality of optical lenses is formed in a right triangle shape.

17 Claims, 14 Drawing Sheets

LAMP FOR VEHICLE

CROSS-REFERENCE TO RELATED APPLICATION

This application claims priority from Korean Patent Application No. 10-2019-0149664 filed on Nov. 20, 2019, which application is incorporated herein by reference in its entirety.

BACKGROUND

1. Technical Field

The present disclosure relates to a lamp for a vehicle, and more particularly, to a lamp for a vehicle that allows a pedestrian to identify a state of the vehicle during day and night by displaying an emblem, logo, or driving status of the vehicle.

2. Description of the Related Art

Generally, for information or symbols, a specific label may be attached to or provided on a specific object or location. For example, for an automobile emblem, it is produced in a variety of designs to symbolize automobile manufacturers, models, and/or types. It is typically mounted on a surface of a vehicle's radiator grille, hood, or trunk for easy identification by third parties.

Also, recently, efforts have been made to enable the identification of the automobile emblem in low-light conditions such as at night. As a result of these efforts, various methods have been proposed. For example, there is a method in which a mark (e.g., logo) portion of a product is made transparent and LEDs are installed within the mark portion to emit light through the transparent portion of the mark.

As another example, only an edge portion of the mark is made transparent so that light is transmitted. In other words, it is a method such that a central portion except an edge of the mark is treated with chrome plating to improve the daytime perception, and light is transmitted through the edge of the mark to enhance nighttime visibility. However, this method is also insufficient to increase nighttime visibility.

In addition, a current vehicle driving status indication may be recognized externally through a signal of the lamp for the vehicle. Accordingly, it is difficult for the pedestrians to directly recognize the state of the vehicle. As a result, pedestrians are at higher risk than those of other transportation groups.

According to the above, there is a need to provide a device capable of directly transmitting the state and information of the vehicle to the pedestrians.

SUMMARY

Aspects of the present disclosure provide a lamp for a vehicle capable of forming various lighting images through a lens unit including a plurality of optical lenses. However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a lamp for a vehicle may include a substrate; a light source unit including a plurality of light sources disposed on the substrate to generate light; a lens unit including a plurality of optical lenses through which the light is transmitted; and an imaging sheet on which the light transmitted through the plurality of optical lenses is projected to form a lighting image. In particular, each of the plurality of optical lenses may be formed in a right triangle shape.

Lengths of two sides of the each of the plurality of optical lenses formed in the right triangle shape may be 1:2. Two adjacent optical lenses among the plurality of optical lenses may form one of a rectangular shape, an equilateral triangle, or an isosceles triangle shape.

An optical lens among the plurality of the optical lenses and a light source among the plurality of the light sources may be formed in a pair, and the optical lens and the light source of the pair may be arranged adjacent to each other in a direction.

A blocking unit including a plurality of wall portions may be further provided, and the plurality of wall portions may be disposed between at least some of the plurality of light sources to guide the light generated from the light source to the optical lens, and to guide the light transmitted through the optical lens to the imaging sheet.

The blocking unit may comprise a first blocking unit including a plurality of first wall portions, and the plurality of first wall portions may be disposed between at least some of the plurality of light sources, and may be formed in a direction of the imaging sheet from the substrate to guide the light generated from the plurality of light sources to the plurality of optical lenses. The plurality of light sources may be respectively disposed in a plurality of first holes formed by the plurality of first wall portions, and a shape of each of the plurality of first holes may correspond to a shape of each of the plurality of optical lenses.

The blocking unit may comprise a second blocking unit including a plurality of second wall portions, and the plurality of second wall portions may be disposed between at least some of the plurality of optical lenses, and may be formed in a direction of the imaging sheet from the lens unit to guide the light transmitted through the plurality of optical lenses to the imaging sheet. The plurality of optical lenses may be respectively disposed in a plurality of second holes formed by the plurality of second wall portions, and a shape of each of the plurality of second holes may correspond to a shape of each of the plurality of optical lenses.

An outer lens through which the light transmitted through the imaging sheet is transmitted may be further provided.

A lamp for a vehicle according to exemplary embodiments of the present disclosure may have one or more of the following effects. A lighting image may be more clearly formed by a plurality of optical lenses formed in a right triangle shape. The benefits of the present disclosure are not limited to the above-mentioned benefits, and other benefits not mentioned may be clearly understood by a person skilled in the art from the claims.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some exemplary embodiments, well-known steps, structures and techniques will not be described in detail to avoid obscuring the disclosure.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the disclosure are described herein with reference to plan and cross-section illustrations that are schematic illustrations of idealized exemplary embodiments of the disclosure. As such, variations from the shapes of the illustrations as a result, for example, of manufacturing techniques and/or tolerances, are to be expected. Thus, exemplary embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, a lamp for a vehicle according to exemplary embodiments of the present disclosure will be described with reference to the drawings.

Figure 1:
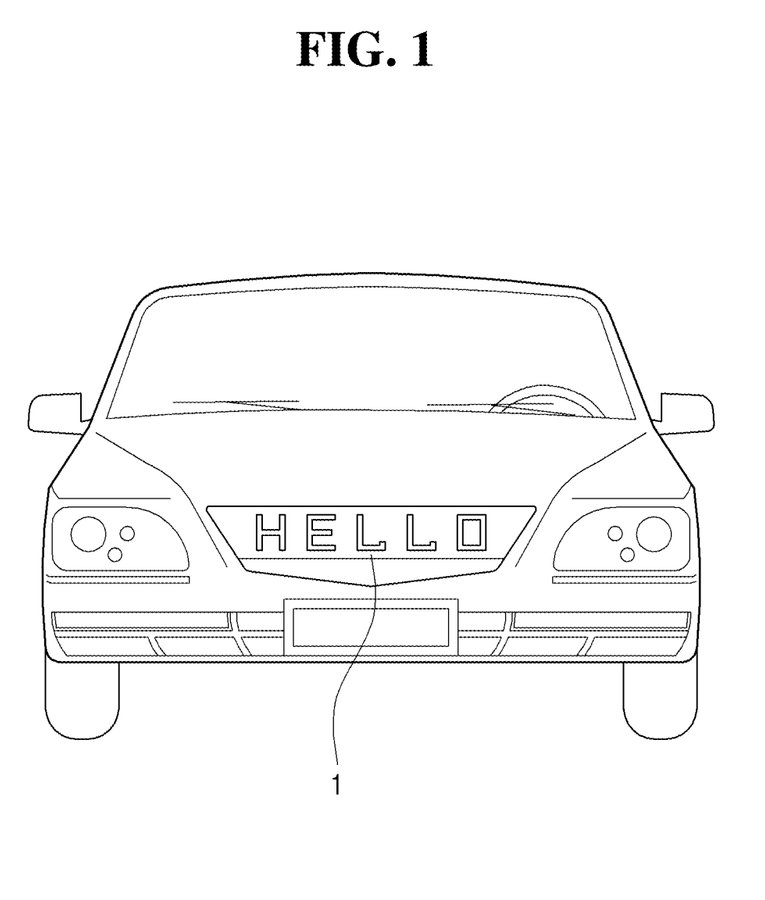
FIG. 1 shows a vehicle equipped with a lamp for a vehicle according to an exemplary embodiment of the present disclosure.
Figure 2:
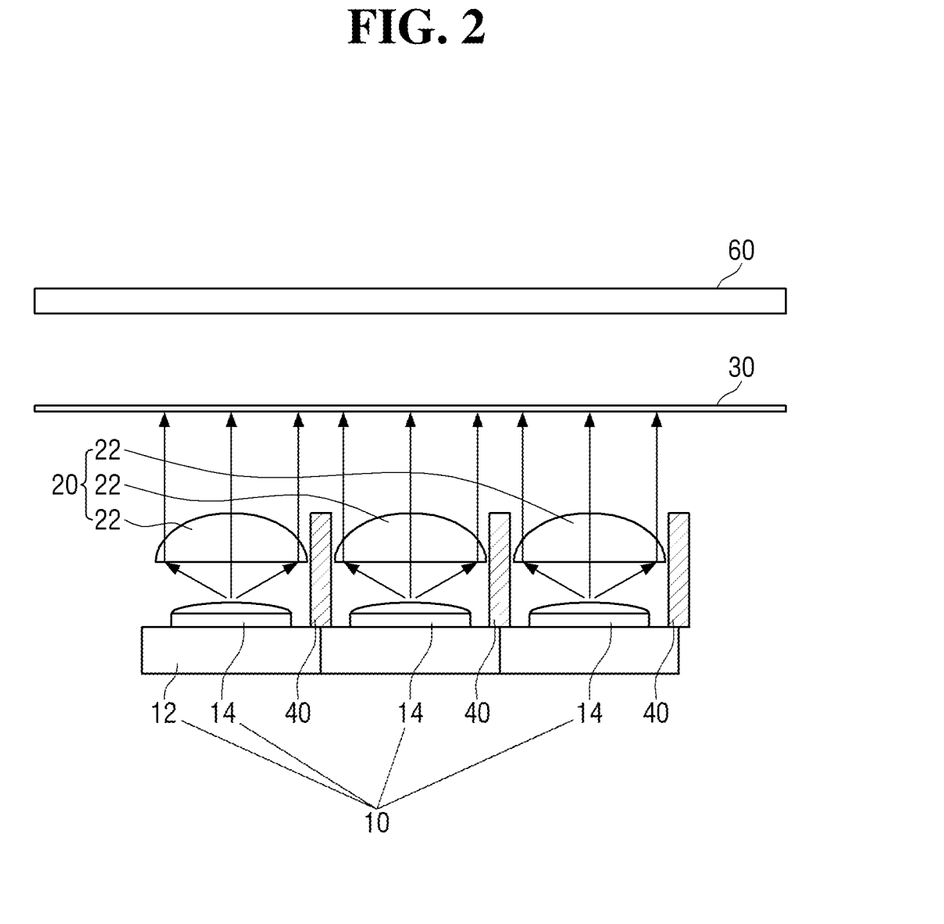
FIG. 2 schematically shows the lamp for the vehicle according to the exemplary embodiment of the present disclosure.
Figure 3:
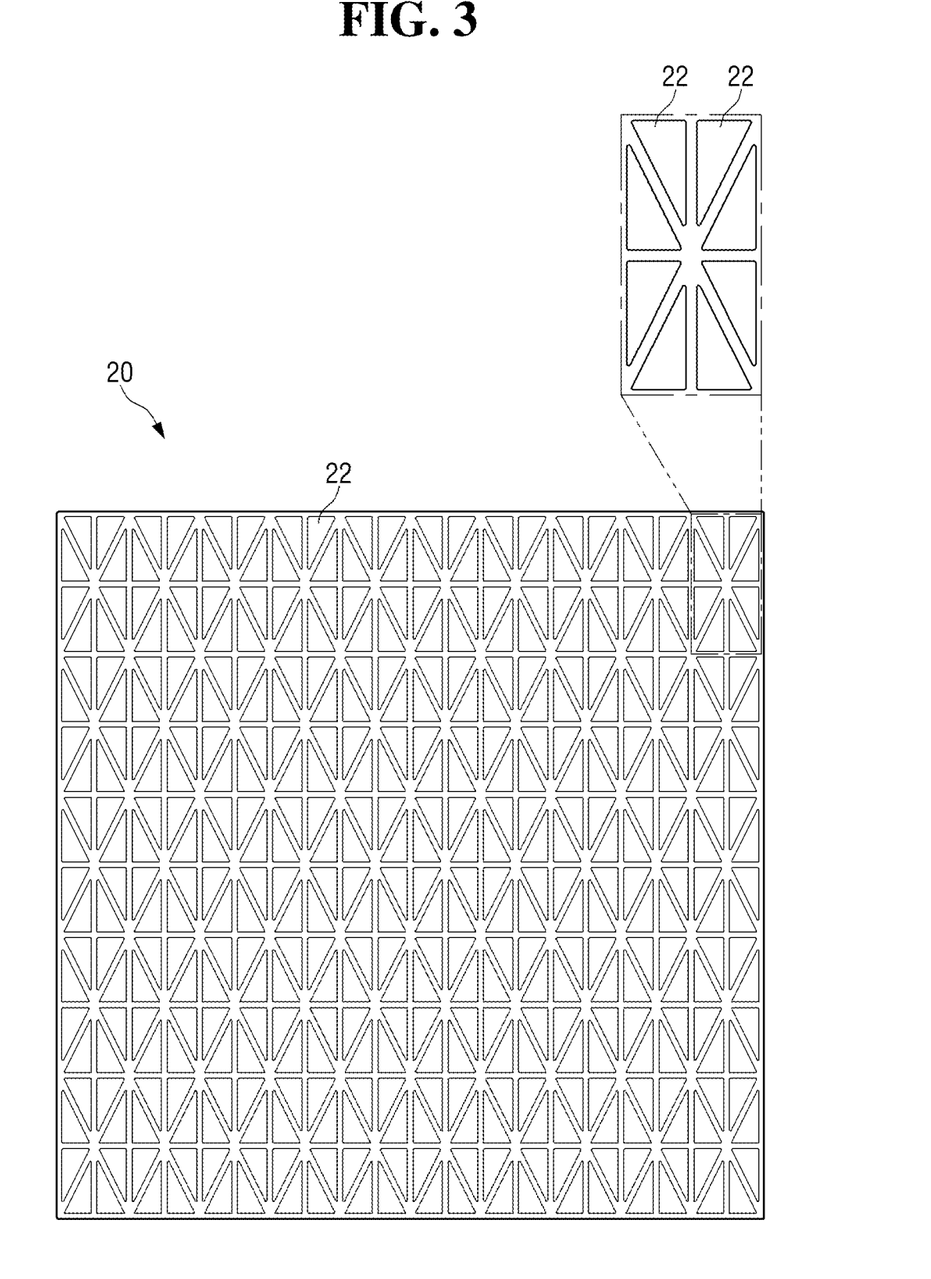
FIGS. 3 and 4 show a plurality of optical lenses of the lamp for the vehicle according to the exemplary embodiment of the present disclosure.
Figure 4:
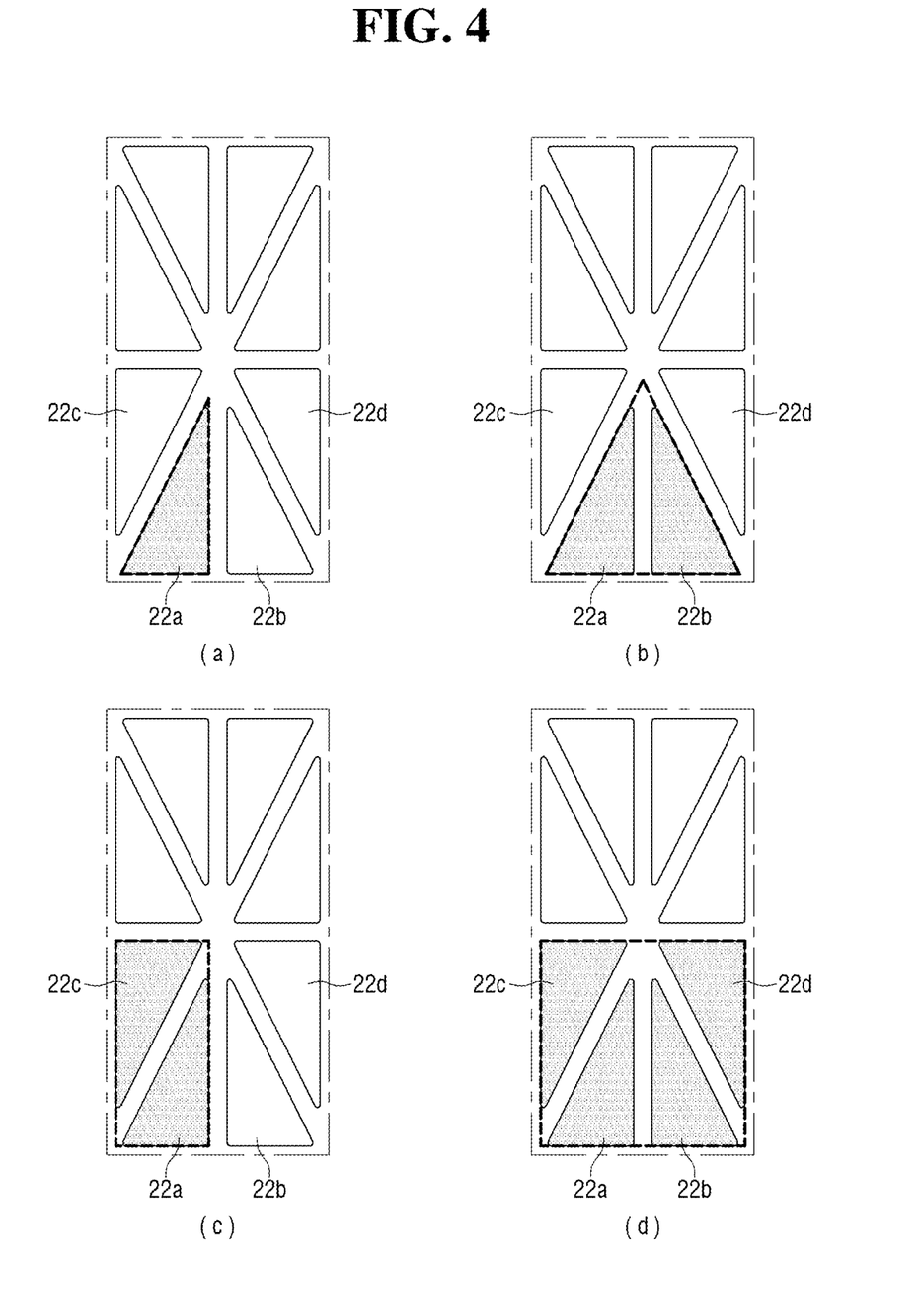
Figure 5:
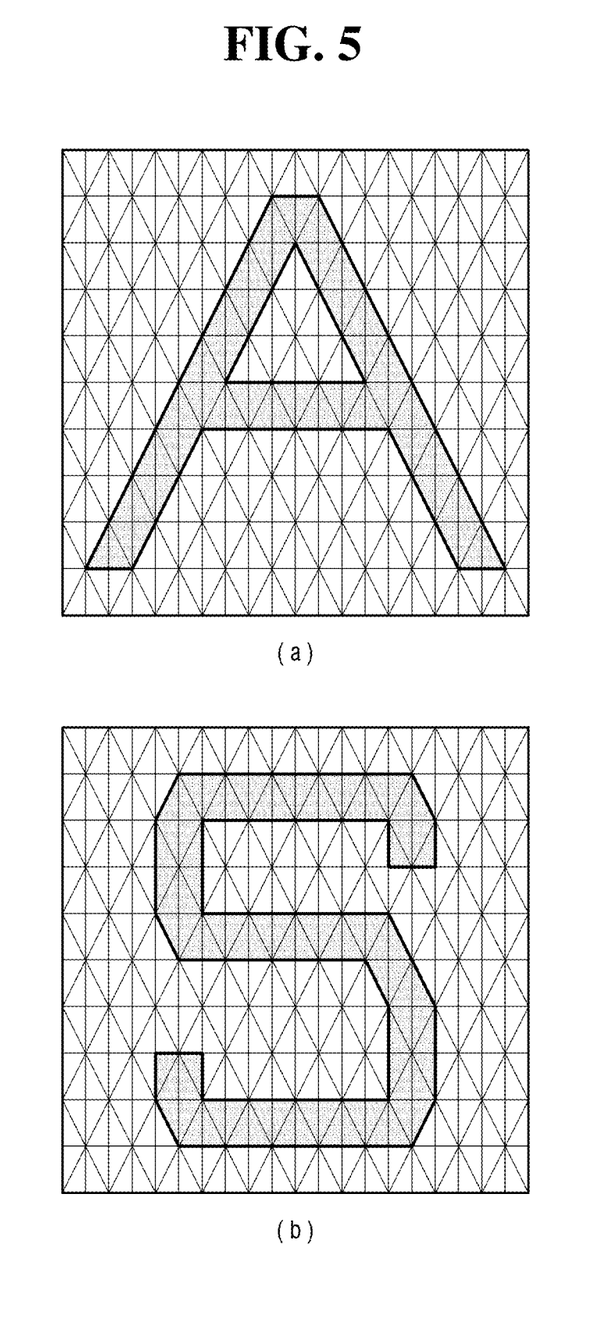
FIG. 5 shows a lighting image of the lamp for the vehicle according to the exemplary embodiment of the present disclosure that is formed in alphabetical characters.
Figure 6:
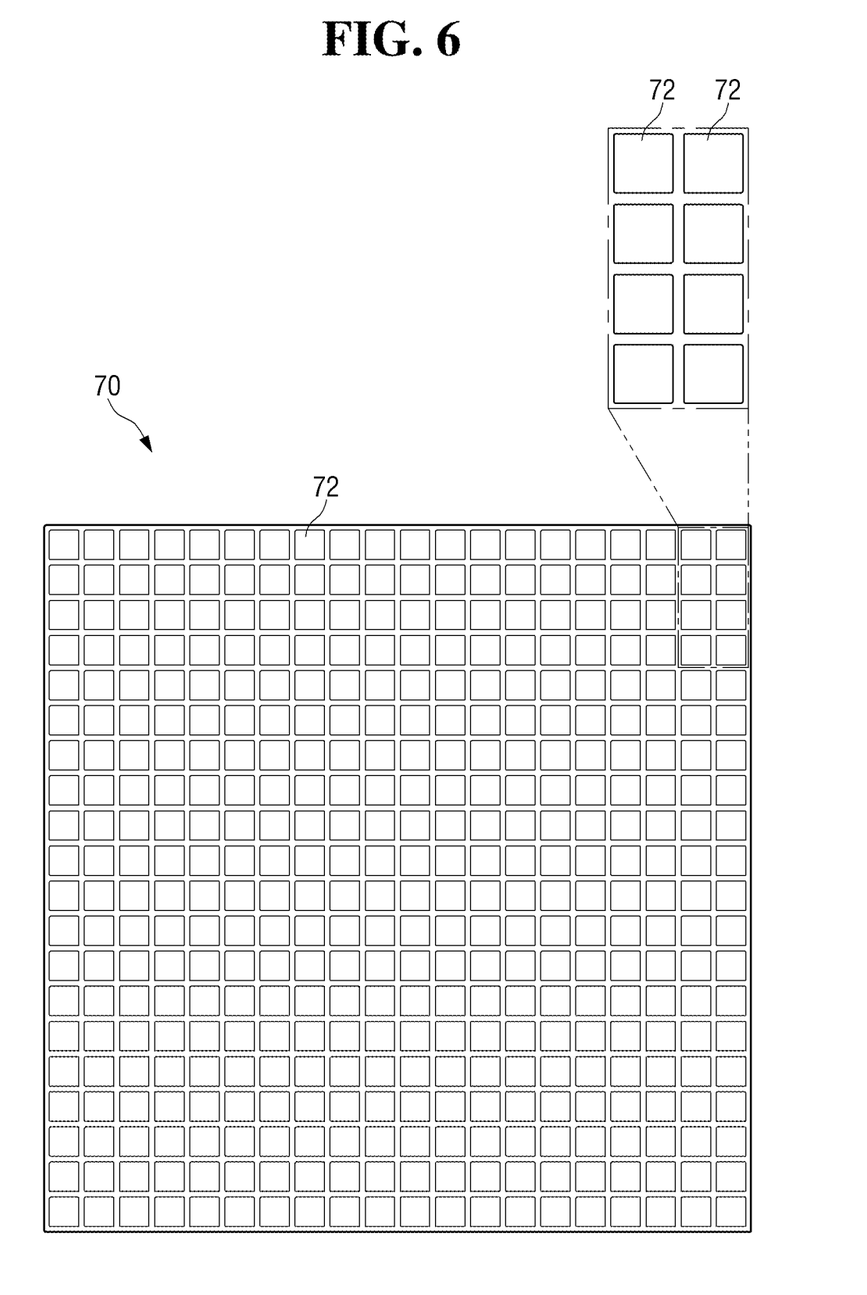
FIGS. 6 and 7 show an alphabetical character lighting image formed by a plurality of optical lenses formed in a square shape.
Figure 7:
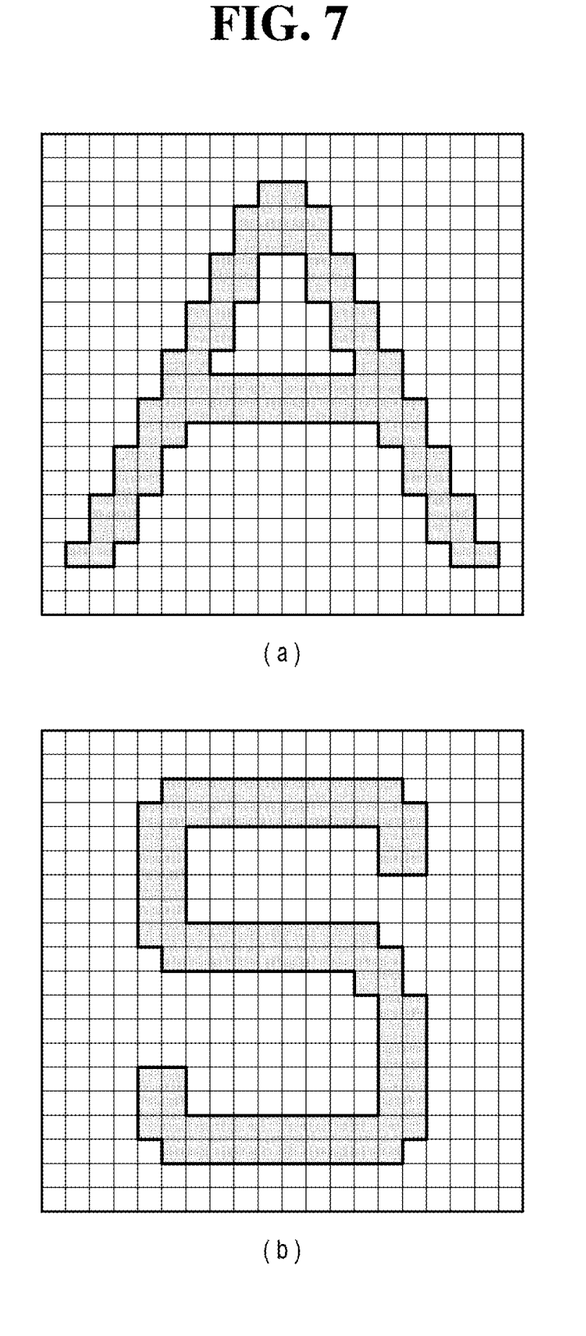

FIG. 1 shows a vehicle equipped with a lamp for a vehicle according to an exemplary embodiment of the present disclosure. FIG. 2 schematically shows the lamp for the vehicle according to the exemplary embodiment of the present disclosure. FIGS. 3 and 4 show a plurality of optical lenses of the lamp for the vehicle according to the exemplary embodiment of the present disclosure. FIG. 5 shows a lighting image of the lamp for the vehicle according to the exemplary embodiment of the present disclosure that is formed in alphabetical characters. FIGS. 6 and 7 show an alphabetical character lighting image formed by a plurality of optical lenses formed in a square shape.

Referring to FIG. 1, the lamp for a vehicle 1 according to the exemplary embodiment of the present disclosure may be attached to a front of the vehicle. However, the present disclosure is not limited thereto, and the lamp for the vehicle 1 may be attached (e.g., mounted, installed, or disposed) to any appropriate locations of the vehicle. In addition, the lamp for the vehicle 1 of the present disclosure may display a state of the vehicle, a character designated by a driver, an emblem, or the like.

For example, as illustrated in FIG. 1, a message conveyed to a pedestrian or other road users may be displayed, or a picture, text diagram, or graph may be displayed on the lamp for the vehicle 1 according to the present disclosure. In addition, words such as "HELLO" and "SELF DRIVING" may be displayed to indicate a driving status of the vehicle.

Referring to FIG. 2, the lamp for the vehicle 1 according to the exemplary embodiment of the present disclosure may include a light source unit 10, a lens unit 20, and an imaging sheet 30. The light source unit 10 may generate light. The light source unit 10 may include a substrate 12 and a plurality of light sources 14 disposed on the substrate 12 to generate light. Accordingly, the light source 14 may generate light in a direction substantially perpendicular to the substrate 12.

In addition, the light source 14 may generate light having the amount of light and/or a color suitable for the use of the lamp for the vehicle of the present disclosure. For example, an light emitting diode (LED) semiconductor light emitting device may be used. However, the present disclosure is not limited thereto, and a laser diode (LD) or a bulb type lamp may be used as the light source 14. A halogen lamp or a high intensity discharge (HID) lamp may be used as the bulb type lamp.

The lens unit 20 may include a plurality of optical lenses 22 through which the light generated from the plurality of light sources 14 may be transmitted. In particular, each optical lens 22 and each light source 14 may be formed in a pair, in which the plurality of light sources 14 may be disposed on the substrate 12 such that the optical lens 22 and the light source 14 formed in a pair are arranged adjacent to each other in one direction (e.g., the axial direction of the lamp).

In addition, the plurality of optical lenses 22 may be formed in a right triangle, and lengths of two sides (e.g., the two sides adjacent to the right angle) of the plurality of optical lenses 22 formed in a right triangle shape may be 1:2. As such, as shown in FIGS. 3 and 4, the lens unit 20 according to the exemplary embodiment of the present disclosure may include the plurality of optical lenses 22 each formed in a right triangle. Two adjacent optical lenses 22 of the plurality of optical lenses 22 may form one of a rectangular shape, an equilateral triangle, or an isosceles triangle shape.

The imaging sheet 30 may form a lighting image by imaging the light transmitted through the plurality of optical lenses 22. Accordingly, the lighting image may be formed based on a shape of the plurality of optical lenses 22 and the imaging sheet 30 through which the light is transmitted. The imaging sheet 30 may be semi-transparent or translucent.

Accordingly, the lighting image formed by the lamp for the vehicle 1 according to the exemplary embodiment of the present disclosure may be formed by the light that passes through the plurality of optical lenses 22 each formed in a right triangle. Therefore, the lighting image may also be formed based on various combinations of a plurality of right triangle images.

Specifically, the lamp for the vehicle 1 according to the exemplary embodiment of the present disclosure may further include a control unit (not shown). The control unit may be configured to determine a vehicle state such as acceleration state or a gear stage, or driver's input in the vehicle, and accordingly control at least one of the plurality of light sources 14 to form a variety of lighting images.

For example, as shown in FIG. 4, the plurality of optical lenses 22 may include a first optical lens 22a, a second optical lens 22b, a third optical lens 22c, and a fourth optical lens 22d, and each of the first to fourth optical lenses may be formed adjacent to each other. Accordingly, when only the first optical lens 22a is turned on by the control unit as shown in panel (a) of FIG. 4, the lighting image may include a right triangle shape. When the first and second optical lenses 22a and 22b are turned on as shown in panel (b) of FIG. 4, the lighting image may include an equilateral triangle shape or a substantially equilateral triangle shape. When the first and third optical lenses 22a and 22c are turned on as shown in panel (c) of FIG. 4, the lighting image may include a rectangular shape. When the first to fourth optical lenses 22a, 22b, 22c, and 22d are turned on as shown in panel (d) of FIG. 4, the lighting image may include a square shape or a substantially square shape.

In addition, the lighting image may include various shapes, such as a rhombus, a triangle, a parallelogram, or a trapezoid, depending on how the plurality of optical lenses 22 are combined.

As described above, due to the plurality of optical lenses 22 each formed in a right triangle, the lighting image of the lamp for the vehicle 1 according to the exemplary embodiment of the present disclosure may form alphabetical characters (e.g., letters) or the like as shown in FIG. 5. Therefore, it may be easily recognized by pedestrians or other road users. Herein, the terms "alphabetical characters," "characters," or "letters" also include numerals, symbols, icons, emojis, signs, or the like.

When a plurality of optical lenses 72 of a lens unit 70 are formed as illustrated in FIG. 6, the alphabetical characters formed by the lighting images may be distorted as shown in FIG. 7, making it difficult for pedestrians to easily recognize them, or it may be difficult to form specific images and specific characters.

Additionally, as shown in FIG. 2, the lamp for the vehicle 1 according to the exemplary embodiment of the present disclosure may further include a blocking unit 40.

The blocking unit 40 may include a plurality of wall portions, in which the plurality of wall portions are disposed between at least some of the plurality of light sources 14 to guide the light generated from each light source 14 to the corresponding optical lens 22, and to guide the light transmitted through the optical lens 22 to the imaging sheet 30. In other words, the plurality of wall portions may protrude in a direction toward the imaging sheet 30 from the substrate 12 to allow the light source 14 and the optical lens 22 formed as a pair to be disposed between the plurality of wall portions. Accordingly, the plurality of wall portions may guide the light generated from the light source 14 to be transmitted to the imaging sheet 30 through the optical lens 22 formed in pair with the light source 14. Light usually diverges or diffuses in several directions rather than in one direction. Therefore, without a blocking unit 40, glare may be generated in the lighting image, making it more difficult for pedestrians to identify the lighting image.

Figure 8:
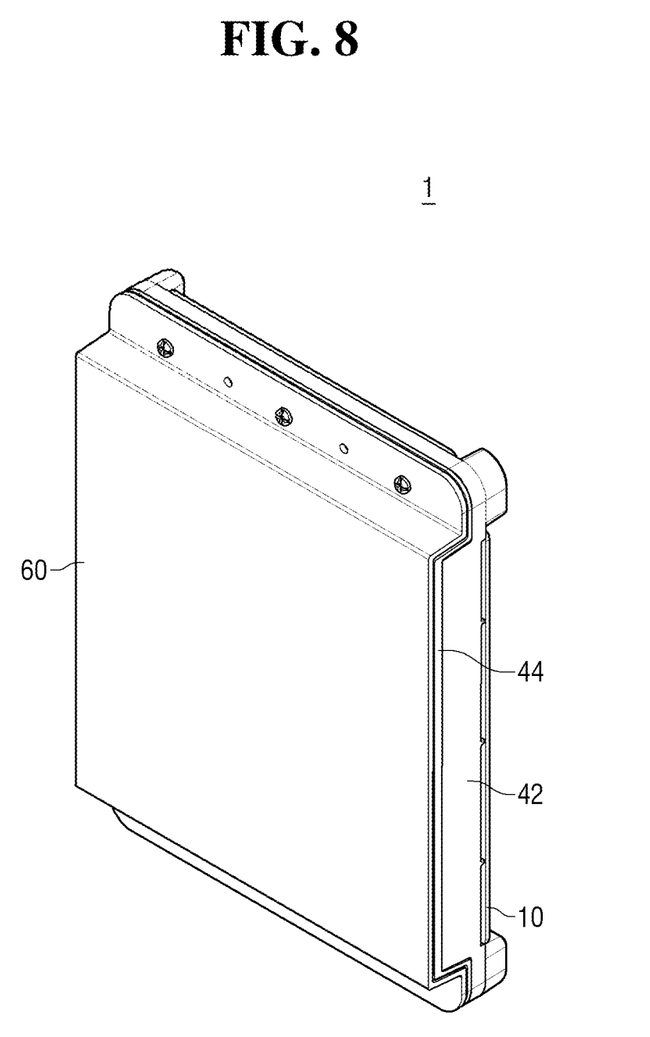
FIGS. 8 to 10 show the lamp for the vehicle according to the exemplary embodiment of the present disclosure.
Figure 9:
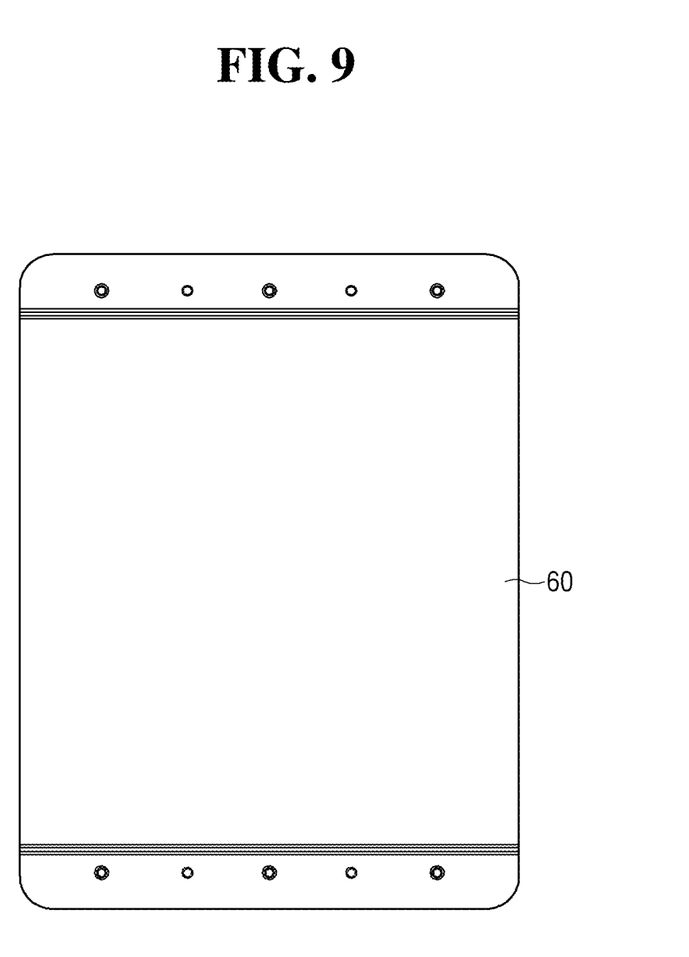
Figure 10:
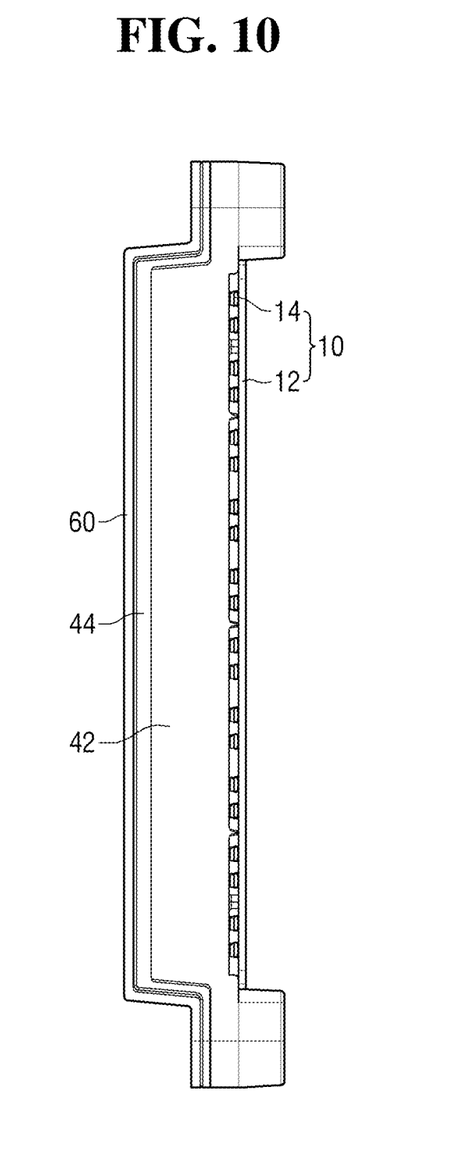
Figure 11:
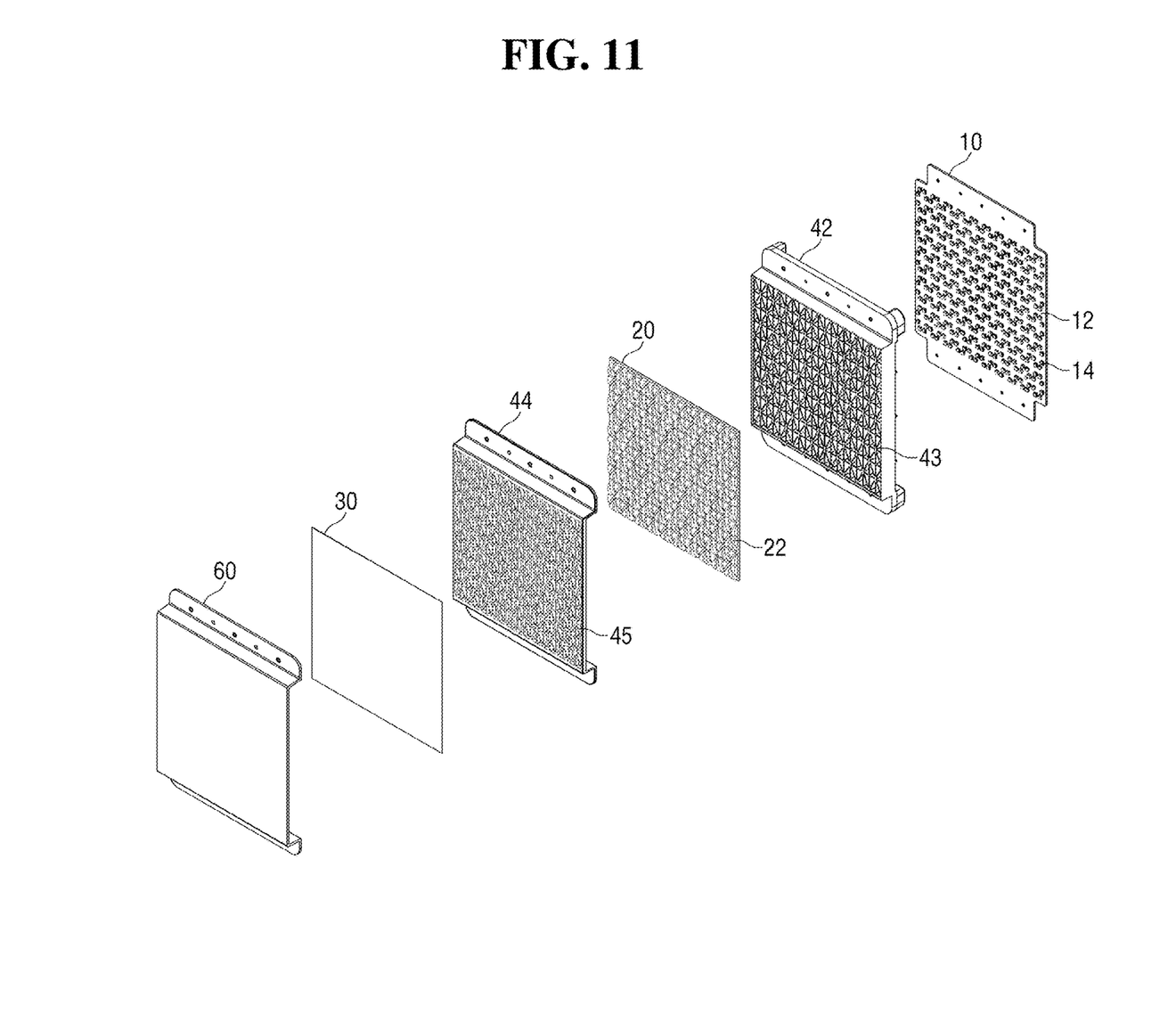
FIG. 11 is an exploded perspective view of the lamp for the vehicle according to the exemplary embodiment of the present disclosure.
Figure 12:
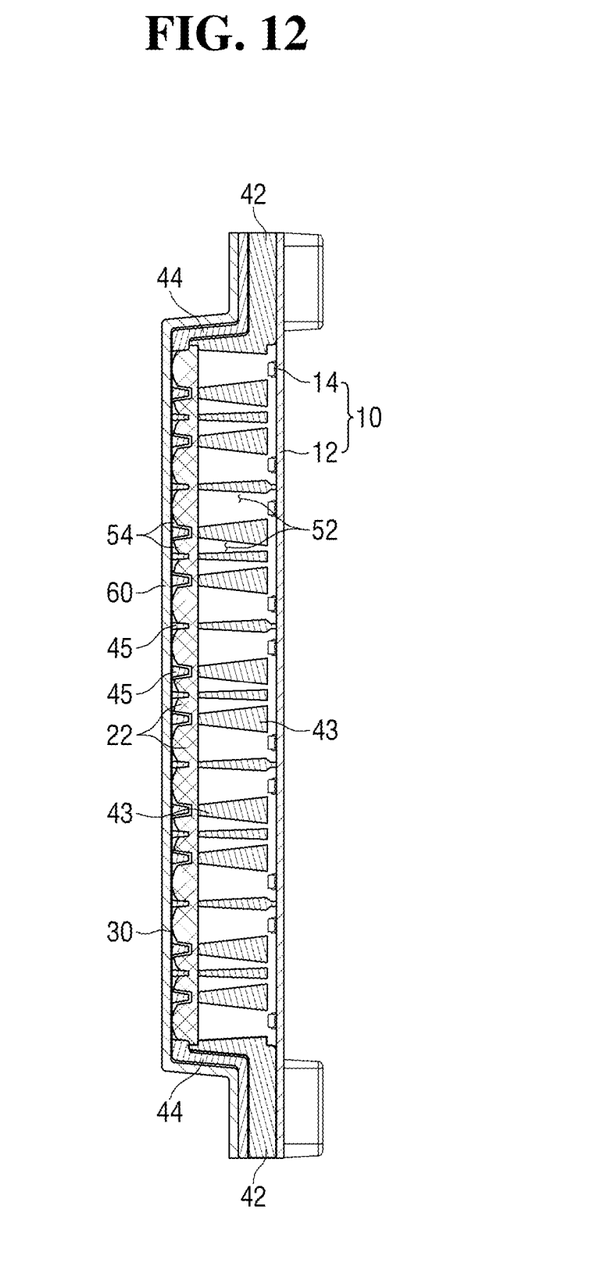
FIG. 12 is a cross-sectional view of the lamp for the vehicle according to the exemplary embodiment of the present disclosure.
Figure 13:
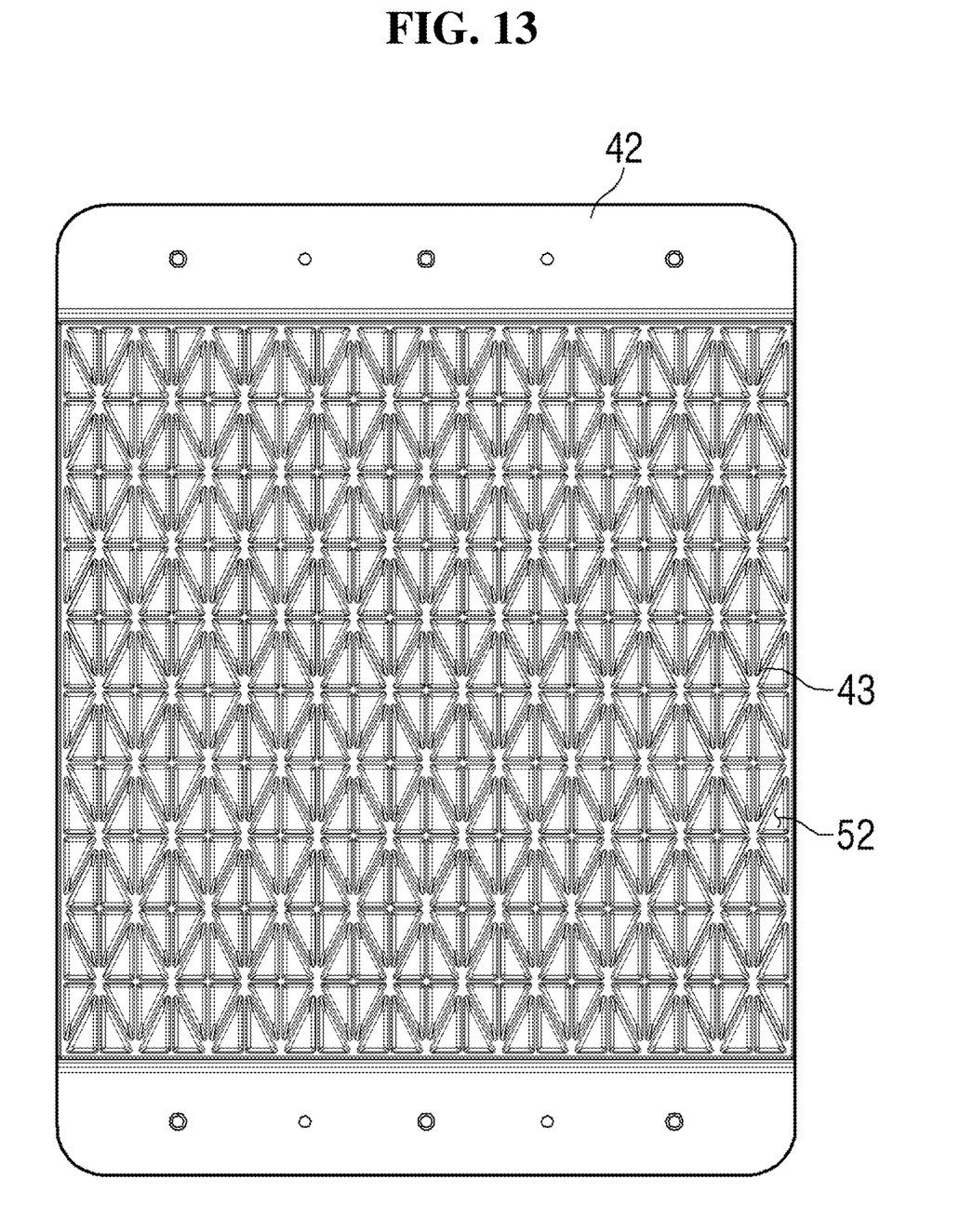
FIG. 13 shows a first blocking unit of the lamp for the vehicle according to the exemplary embodiment of the present disclosure.
Figure 14:
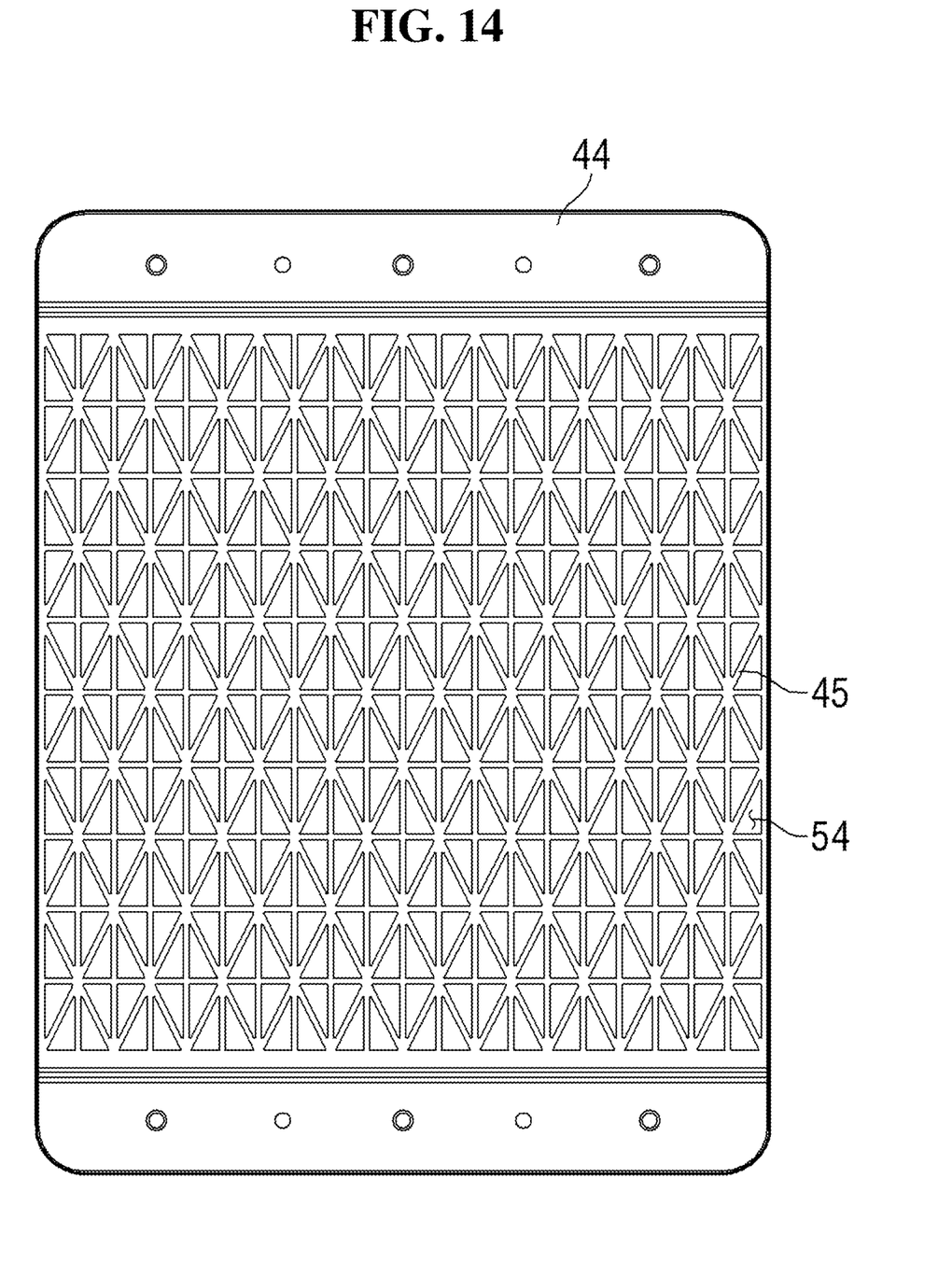
FIG. 14 shows a second blocking unit of the lamp for the vehicle according to the exemplary embodiment of the present disclosure.

FIGS. 8 to 10 show the lamp for the vehicle according to the exemplary embodiment of the present disclosure. FIG. 11 is an exploded perspective view of the lamp for the vehicle according to the exemplary embodiment of the present disclosure. FIG. 12 is a cross-sectional view of the lamp for the vehicle according to the exemplary embodiment of the present disclosure. FIG. 13 shows a first blocking unit of the lamp for the vehicle according to the exemplary embodiment of the present disclosure. FIG. 14 shows a second blocking unit of the lamp for the vehicle according to the exemplary embodiment of the present disclosure.

As shown in FIGS. 8 to 14, the lens unit 20 of the lamp for the vehicle 1 according to the exemplary embodiment of the present disclosure may include the plurality of optical lenses 22, and the plurality of optical lenses 22 may be formed to protrude in the direction of the imaging sheet 30. In addition, the plurality of optical lenses 22 may maintain a right triangle shape and be formed to protrude in the direction of the imaging sheet 30.

Depending on the shape of the lens unit 20, the blocking unit 40 may include a first blocking unit 42 and a second blocking unit 44. More specifically, the first blocking unit 42 may include a plurality of first wall portions 43, and the plurality of first wall portions 43 may be disposed between at least some of the plurality of light sources 14, and may be formed in the direction of the imaging sheet 30 from the substrate 12 to guide each light emitted from the plurality of light sources 14 to the plurality of optical lenses 22.

Specifically, as shown in FIG. 13, the first blocking unit 42 may include a plurality of first holes 52 formed by the plurality of first wall portions 43, and the light source 14 may be disposed in each of the plurality of first holes 52. Accordingly, the plurality of light sources 14 may be attached to the substrate 12 according to positions of the plurality of first holes 52. In addition, a shape of the first holes 52 may correspond to a shape of the plurality of optical lenses 22. In other words, the plurality of first wall portions 43 may be formed to protrude in a direction of the lens unit 20 from the substrate 12 to allow the shape of the plurality of first holes 52 to correspond to the shape of the plurality of optical lenses 22.

The second blocking unit 44 may include a plurality of second wall portions 45, and the plurality of second wall portions 45 may be disposed between at least some of the plurality of optical lenses 22, and may be formed in the direction of the imaging sheet 30 from the lens unit 20 to guide each light transmitted through the plurality of optical lenses 22 to the imaging sheet 30.

Specifically, the second blocking unit 44 may have a plurality of second holes 54 formed by the plurality of second wall portions 45, and the optical lens 22 may be disposed in each of the plurality of second holes 54. For example, the plurality of second wall portions 45 may be formed to surround a lateral circumferential surface of the plurality of optical lenses 22. However, the present disclosure is not limited to such a configuration.

As a result, a shape of the second hole 54 may correspond to the shape of the plurality of optical lenses 22. In other words, the plurality of second wall portions 45 may be formed to protrude in the direction of the lens unit 20 from the substrate 12 to allow the shape of the plurality of second holes 54 to correspond to the shape of the plurality of optical lenses 22.

Therefore, the light formed in the light source 14 may be guided to the optical lens 22 formed in the axial direction by the plurality of first wall portions 43 that surround the light source 14 and may be transmitted through the optical lens 22. Subsequently, the light may be guided by the plurality of second wall portions 45 that surround the circumferential surface of the optical lens 22 and transmitted to the imaging sheet 30.

Accordingly, the light emitted from each light source 14 may more efficiently transmit through each optical lens 22 due to the shape of the plurality of first holes 52, and may reach the imaging sheet 30 due to the shape of the second holes 54. Therefore, the right triangle shape image within the lighting image of the present disclosure may be more efficiently formed.

As a result, as the plurality of light sources 14 are controlled by the control unit, at least one right triangle shape image may be formed, and as described above, various lighting images may be clearly formed. Therefore, pedestrians may efficiently recognize pictures, letters, diagrams, graphs, etc. formed by the lighting image.

Additionally, the lamp for the vehicle 1 of the present disclosure may further include an outer lens unit 60, and the outer lens unit 60 may be formed to transmit the light transmitted through the imaging sheet 30. In addition, the outer lens unit 60 may prevent damage to the imaging sheet 30.

Accordingly, the light generated from the light source 14 of the lamp for the vehicle 1 according to the exemplary embodiment of the present disclosure may be guided along the axial direction by the plurality of first wall portions 43, transmitted through the right triangle-shaped optical lens 22, transferred to the imaging sheet 30 by the plurality of second wall portions 45, and sequentially transmitted through the imaging sheet 30 and the outer lens unit 60. Due to this configuration, various lighting images may be efficiently formed and recognized by pedestrians.

In concluding the detailed description, those skilled in the art will appreciate that many variations and modifications can be made to the exemplary embodiments without substantially departing from the principles of the present disclosure. Therefore, the disclosed exemplary embodiments are used in a generic and descriptive sense only and not for purposes of limitation.

What is claimed is:

1. A lamp for a vehicle, comprising:
   a substrate;
   a light source unit including a plurality of light sources disposed on the substrate to generate light;
   a lens unit including a plurality of optical lenses through which the light is transmitted; and
   an imaging sheet on which the light transmitted through the plurality of optical lenses is projected to form a lighting image,
   wherein a projected shape of each of the plurality of optical lenses onto a plane that is perpendicular to a light axis of the light source is formed in a right triangle shape.

2. The lamp for the vehicle of claim 1, wherein lengths of two sides of the each of the plurality of optical lenses formed in the right triangle shape is 1:2.

3. The lamp for the vehicle of claim 1, wherein two adjacent optical lenses among the plurality of optical lenses form one of a rectangular shape, an equilateral triangle, or an isosceles triangle shape.

4. The lamp for the vehicle of claim 1, wherein an optical lens among the plurality of the optical lenses and a light source among the plurality of the light sources are formed in a pair, and
   wherein the optical lens and the light source of the pair are arranged adjacent to each other in a direction.

5. The lamp for the vehicle of claim 4, further comprising:
   a blocking unit including a plurality of wall portions,
   wherein the plurality of wall portions are disposed between at least some of the plurality of light sources to guide the light generated from the light source to the optical lens, and to guide the light transmitted through the optical lens to the imaging sheet.

6. The lamp for the vehicle of claim 5, wherein the blocking unit comprises:
   a first blocking unit including a plurality of first wall portions,
   wherein the plurality of first wall portions are disposed between at least some of the plurality of light sources, and formed in a direction of the imaging sheet from the substrate to guide the light generated from the plurality of light sources to the plurality of optical lenses.

7. The lamp for the vehicle of claim 6, wherein the plurality of light sources are respectively disposed in a plurality of first holes formed by the plurality of first wall portions, and
   wherein a shape of each of the plurality of first holes corresponds to a shape of each of the plurality of optical lenses.

8. The lamp for the vehicle of claim 5, wherein the blocking unit comprises:
   a second blocking unit including a plurality of second wall portions,
   wherein the plurality of second wall portions are disposed between at least some of the plurality of optical lenses, and formed in a direction of the imaging sheet from the lens unit to guide the light transmitted through the plurality of optical lenses to the imaging sheet.

9. The lamp for the vehicle of claim 8, wherein the plurality of optical lenses are respectively disposed in a plurality of second holes formed by the plurality of second wall portions, and
   wherein a shape of each of the plurality of second holes corresponds to a shape of each of the plurality of optical lenses.

10. The lamp for the vehicle of claim 1, further comprising:
    an outer lens through which the light transmitted through the imaging sheet is transmitted.

11. A lamp for a vehicle, comprising:
    a substrate;
    a light source unit including a plurality of light sources disposed on the substrate to generate light;
    a lens unit including a plurality of optical lenses through which the light is transmitted; and an imaging sheet on which the light transmitted through the plurality of optical lenses is projected to form a lighting image, wherein each of the plurality of optical lenses is formed in a right triangle shape, and wherein two adjacent optical lenses among the plurality of optical lenses form one of a rectangular shape, an equilateral triangle, or an isosceles triangle shape.

12. The lamp for the vehicle of claim 11, wherein an optical lens among the plurality of the optical lenses and a light source among the plurality of the light sources are formed in a pair, and wherein the optical lens and the light source of the pair are arranged adjacent to each other in a direction.

13. The lamp for the vehicle of claim 12, further comprising:

a blocking unit including a plurality of wall portions, wherein the plurality of wall portions are disposed between at least some of the plurality of light sources to guide the light generated from the light source to the optical lens, and to guide the light transmitted through the optical lens to the imaging sheet.

14. The lamp for the vehicle of claim 13, wherein the blocking unit comprises:

a first blocking unit including a plurality of first wall portions, wherein the plurality of first wall portions are disposed between at least some of the plurality of light sources, and formed in a direction of the imaging sheet from the substrate to guide the light generated from the plurality of light sources to the plurality of optical lenses.

15. The lamp for the vehicle of claim 14, wherein the plurality of light sources are respectively disposed in a plurality of first holes formed by the plurality of first wall portions, and wherein a shape of each of the plurality of first holes corresponds to a shape of each of the plurality of optical lenses.

16. The lamp for the vehicle of claim 13, wherein the blocking unit comprises:

a second blocking unit including a plurality of second wall portions, wherein the plurality of second wall portions are disposed between at least some of the plurality of optical lenses, and formed in a direction of the imaging sheet from the lens unit to guide the light transmitted through the plurality of optical lenses to the imaging sheet.

17. The lamp for the vehicle of claim 16, wherein the plurality of optical lenses are respectively disposed in a plurality of second holes formed by the plurality of second wall portions, and wherein a shape of each of the plurality of second holes corresponds to a shape of each of the plurality of optical lenses.

* * * * *